United States Patent [19]

Igarashi et al.

[11] Patent Number: 4,604,700
[45] Date of Patent: Aug. 5, 1986

[54] APPARATUS FOR INDICATING AN OPTIMUM TIME TO SHIFT A MANUAL TRANSMISSION INSTALLED IN A VEHICLE

[75] Inventors: Kohei Igarashi, Susono; Kazuo Tomita, Gotenba, both of Japan

[73] Assignee: Toyota Jidosha Kabushiki Kaisha, Japan

[21] Appl. No.: 533,560

[22] Filed: Sep. 19, 1983

[30] Foreign Application Priority Data

Feb. 25, 1983 [JP] Japan .................................. 58-031132

[51] Int. Cl.⁴ ......................... B60K 41/18; G07C 5/08; G09B 19/16
[52] U.S. Cl. ..................................... 364/424; 73/114; 364/442
[58] Field of Search ...................... 364/424, 442, 424.1; 340/52 R, 52 D; 434/71; 73/114, 117.3

[56] References Cited

U.S. PATENT DOCUMENTS

| 4,150,497 | 4/1979 | Weber | 434/71 |
| 4,355,296 | 10/1982 | Drone | 340/52 D |
| 4,439,158 | 3/1984 | Weber | 434/71 |
| 4,463,427 | 7/1984 | Bonnetain et al. | 364/424.1 |
| 4,492,112 | 1/1985 | Igarashi et al. | 73/117.3 |
| 4,542,460 | 9/1985 | Weber | 364/424.1 |

FOREIGN PATENT DOCUMENTS

| 3128080 | 2/1983 | Fed. Rep. of Germany | 364/424.1 |
| 3138371 | 4/1983 | Fed. Rep. of Germany | 364/424.1 |

Primary Examiner—Felix D. Gruber
Attorney, Agent, or Firm—Parkhurst & Oliff

[57] ABSTRACT

An apparatus for indicating an optimum time to shift a manual transmission in a vehicle. An electronic control unit is provided to compare the actual gear shift position with the electronically memorized optimum gear shift position. The optimum gear shift position is predetermined by examining the parameters of engine speed, vehicle speed, engine load and engine temperature. If the actual gear shift position differs from the memorized and stored optimum gear shift position, the operator is notified by a shift indicator lamp or loudspeaker.

21 Claims, 7 Drawing Figures

APPARATUS FOR INDICATING AN OPTIMUM TIME TO SHIFT A MANUAL TRANSMISSION INSTALLED IN A VEHICLE

BACKGROUND OF THE INVENTION

The present invention relates to an apparatus for indicating an optimum time to shift a manual transmission installed in a vehicle, and more particularly to the apparatus for indicating an optimum time to shift a manual transmission working in conjunction with an electronically controlled fuel injection type engine.

A goal of the motorized vehicle industry is to reduce the amount of fuel consumed in the vehicles it now produces to reduce the rate at which world-wide oil reserves are being depleted.

In general, the amount of fuel consumed by a vehicle varies according to engine performance and the operator's driving technique. If an operator has little knowledge of when a manual transmission should be shifted, an apparatus which indicates the optimum time to shift gives the uninformed operator the proper cue for when to shift, thereby decreasing the fuel consumption rate.

Known devices have attempted to obviate the aforementioned problems by monitoring the vacuum created in an air intake pipe of an engine thereby indicating the load upon an engine and others have indicated how far a vehicle would travel at the present fuel consumption rate, i.e. Km/1 or MPG.

Neither of the aforementioned devices actually instructs the operator on how to actually operate the car, hence not achieving all potential advantages of knowing how to reduce the fuel consumption rate.

In view of the aforementioned background, an apparatus that actually instructs the operator of a vehicle when to shift the transmission, in accordance with engine RPM and the intake vacuum, has been devised. Additionally, an apparatus having a memory device memorizes optimum shifting times in conjunction with various operating parameters such as engine RPM, vehicle speed and the load upon the engine, and compares them to actual vehicle operating conditions. When the actual conditions vary from the memorized conditions, the apparatus recommends the optimum gear which should be used.

According to the previous design of a similar apparatus, the optimum time to shift gears was not correctly indicated until the temperature of the engine coolant reached a certain elevated value. Therefore, the goal of reducing fuel consumption in the warming-up stages of the engine was not achieved.

SUMMARY OF THE INVENTION

The present invention was made in view of the foregoing background and to overcome the aforementioned drawbacks. It is accordingly an object of this invention to provide an apparatus for indicating an optimum time to shift a manual transmission, whereby the optimum choice of gears is correctly indicated regardless of the temperature of the engine coolant.

To attain the above objects, an apparatus for indicating an optimum time to shift for use in a vehicle having an engine and a transmission, comprising:

an engine RPM sensor for detecting an engine's speed;

an engine load sensor for detecting the warming-up stages of the engine;

memory means for memorizing optimum shift zone conditions when viewing the parameters of engine RPM and engine load in both the warming-up and warmed-up stages of the engine;

comparison means for comparing the actual operating values of the engine with the memorized parameters of engine RPM, engine load and engine temperature;

data processing means for issuing a signal to shift the transmission if the stored parameters do not match the actual operating parameters; and an instruction means for directing the operator to shift the transmission in accordance with the output signal of the data processing means, whereby if the actual shift conditions of the transmission differ from the stored optimum shift conditions, the operator is notified by the output signal of the instruction means.

BRIEF DESCRIPTION OF THE DRAWINGS

The above objects, features and advantages of the present invention will become more apparent from reading the following description of the preferred embodiments taken in connection with the accompanying drawings wherein.

DETAILED DESCRIPTION OF THE PREFERRED EMBODIMENTS

The present invention is described in detail with reference to the accompanying drawings which illustrate an apparatus for indicating an optimum time to shift a manual transmission according to the present invention.

Figure 1:
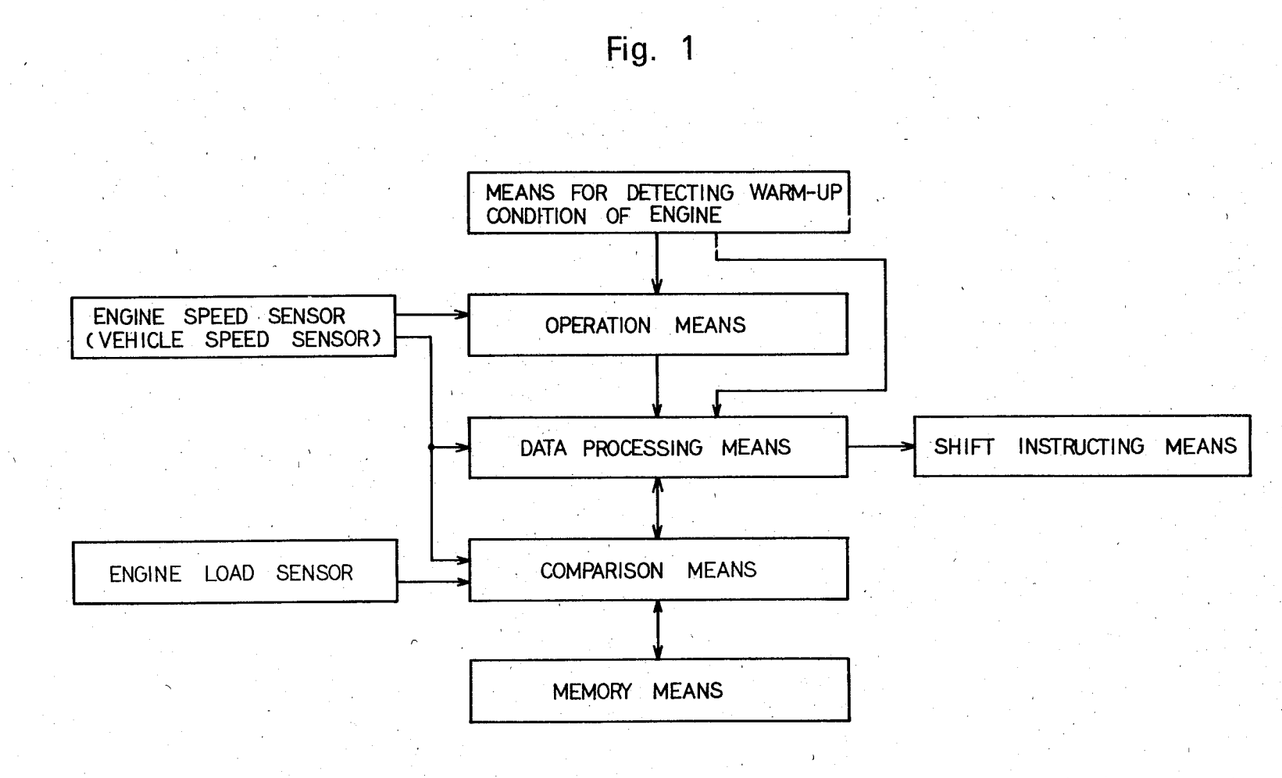
FIG. 1 is a block diagram of an apparatus according to the present invention.

FIG. 1 discloses a functional block diagram which is incorporated into the present invention. The apparatus is provided with means to detect whether the engine is already warmed-up or not. The output signals of the means is inputted to an operation means and a data processing means. An output signal of an engine RPM sensor is also inputted to the operation means and the data processing means. Further, the data processing means receives output signals from the engine load sensor and a memory means, both having been previously directed through a comparison means, with the analyzed input then directed to a shifting instruction means. For example, engine parameters of RPM, temperature and engine load are inputted into the data processing means. The data processing means then compares the actual shifting parameters to those parameters placed in the memory means. When the actual shifting parameters differ from those in the memory means, the output of the data processing means is fed into the shift instructing means, resulting in an instruction given to the vehicle operator by utilizing a lamp or an audible speaker.

Figure 2:
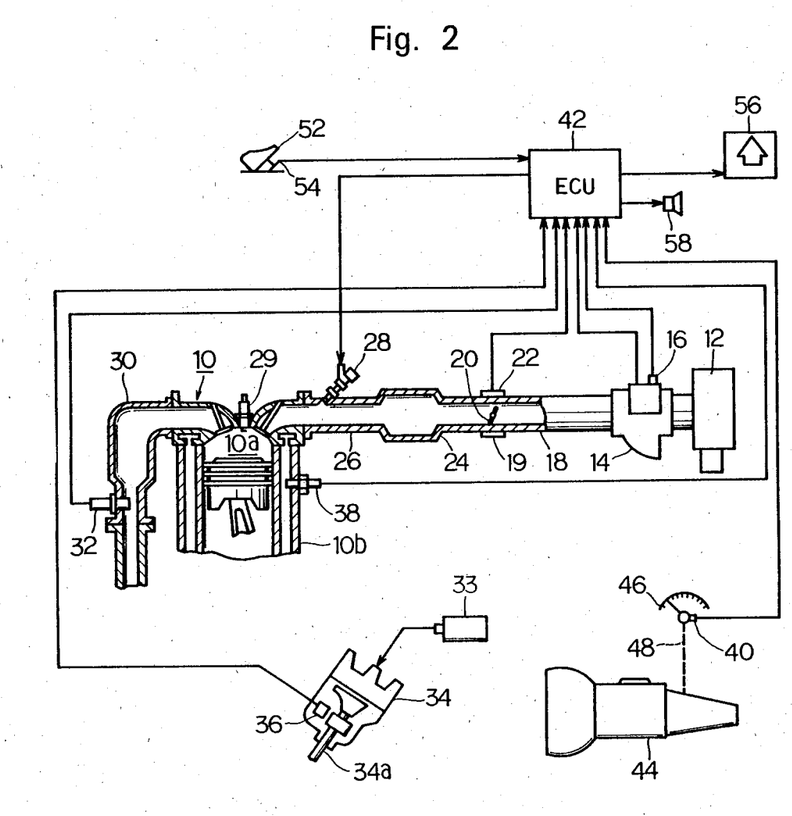
FIG. 2 is a partial cross-sectional view of an automobile equipped with an electronic controlled fuel injection type engine and a manual transmission.

Referring next to FIG. 2, a partial cross-sectional view of an electrically controlled fuel injection type engine is shown.

An air cleaner 12 receives air from outside of the engine, and the clean air is directed into a passage within an intake pipe. An air flow meter 14 is provided in the intake passage and is designed to calculate the amount of air introduced into the air cleaner 12. The air flow meter 14, contains an intake-air temperature sensor 16, provided for determining the temperature of the intake air. A throttle body 19 is secured to the intake pipe 18 and includes a throttle valve 20 therein, which is adapted to rotate in accordance with the displacement of an accelerator means (not shown in drawings) and thereby controls the amount of air flow. A throttle sensor 22, provided within the throttle body 19, detects the amount that the throttle valve 20 opens and included therein is an idle switch which turns on only when the throttle valve 20 is fully closed. Downstream of the throttle valve 20 is a surge tank 24 which is provided to prevent any intake pressure interference. A fuel injector 28 is mounted on each of the intake manifolds 26 and injects the pressurized fuel toward the intake port. The numeral 29 indicates a spark plug for igniting the air-fuel mixture that is introduced into the combustion chamber 10a of an engine 10. An oxygen concentration sensor ($O_2$ sensor) 32 is mounted on an exhaust manifold and detects the air-fuel ratio from the concentration of oxygen in the exhaust gas. A distributor shaft 34a, within distributor 34, rotates according to the rotation of the crank shaft of an engine 10. The function of distributor 34 is to distribute the high voltage ignition signals created by an ignition coil 33, to the spark plugs 29, mounted on each cylinder of the engine 10. A crank angle sensor 36, mounted in the distributor 34, is designed to generate the crank angle signal of the engine speed in accordance with the rotation of the distributor shaft 34a. A water temperature sensor 38 is mounted on a cylinder block 10b of the engine 10 and detects the temperature of the engine coolant. A vehicle speed sensor 40 detects the vehicle's speed by monitoring the rotation speed of a speedometer cable 48 which is operatively engaged with the output shaft of the manual transmission. An electronic control unit 42 (hereinafter referred to as ECU) calculates the amount of fuel injected for a complete engine stroke according to the amount of air taken in and the engine speed (RPM) calculated from the crank angle output of the crank angle sensor 36. The amount of fuel injected by the fuel injection valve 28 is controlled by the ECU, which monitors the opening of the throttle valve 20, the air-fuel ratio and the temperature of the engine coolant. When the fuel supply to the engine is interpreted as inadequate, the ECU 42 generates a signal to the fuel injection valve 28 for a specific valve opening time in order to compensate for the inadequate fuel supply.

A clutch switch 54 installed on the vehicle's floor detects the position of a clutch pedal 52. The clutch pedal 52 allows for appropriate shifting of the manual transmission. A shift-up indicator lamp 56, located in the operator's compartment, generates a shift-up signal indicating an optimum time to shift the manual transmission. A loudspeaker 58 confirms the performance of the correct shifting procedure suggested by the shift-up indicator lamp 56.

The ECU 42 contains a memory means and a data processing means. The memory means contains data relating to optimum shift conditions for an engine which is warmed-up and one that is in the process of warming-up. The data processing means compares the stored data with the actual operating conditions, and when the stored data differs from the actual operating conditions, the shift indicator lamp turns on and the loudspeaker 58 also confirms the need to shift.

Figure 3:
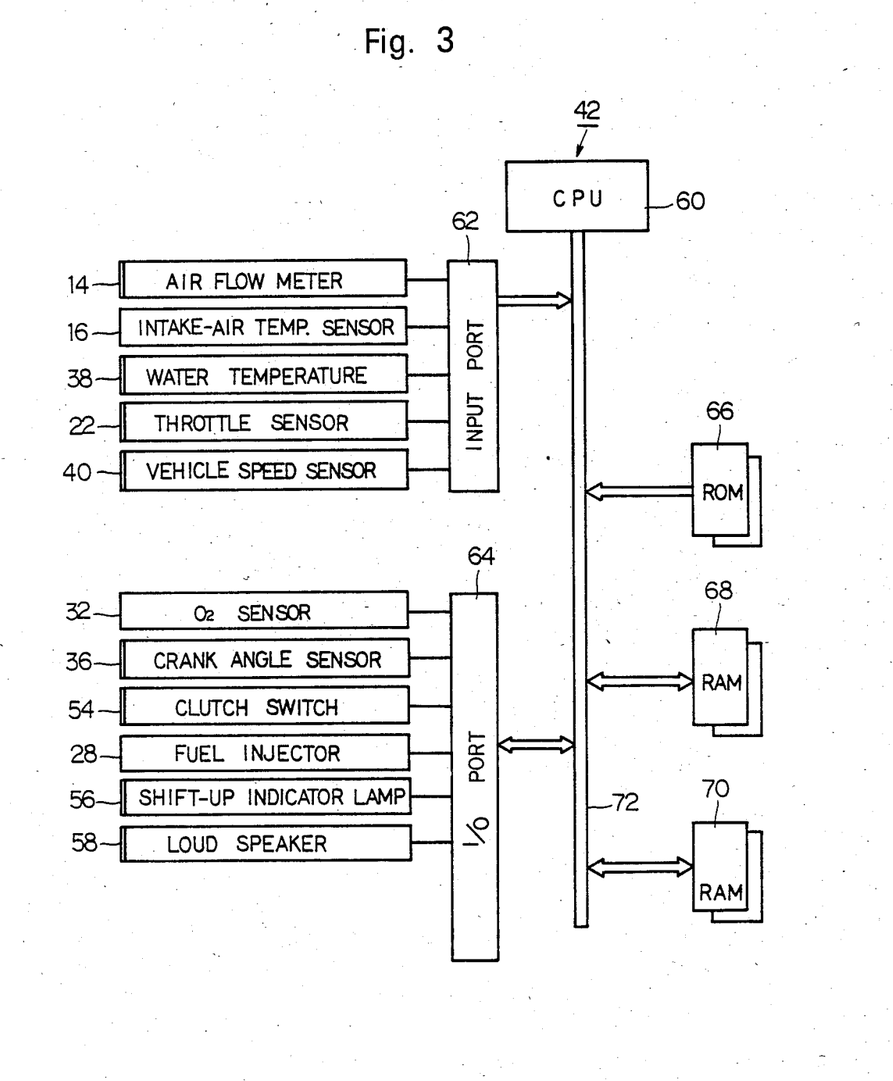
FIG. 3 is a circuit diagram of the electronic control unit (ECU) illustrated in FIG. 2.

FIG. 3 indicates that the ECU 42 functions as a digital computer and comprises a central processing unit 60 (hereinafter referred to as CPU) which carries out the arithmetic and logic processing means, input ports 62, input/output ports 64, a read-only memory 66 (hereinafter referred to as ROM) which stores a predetermined control program and arithmetic constants therein, a random-access memory 68 (hereinafter referred to as RAM) which temporarily stores the calculated data of the CPU 60, and a RAM 70 which stores the calculated data from each component of the aforementioned RAM, ROM, CPU and ports. For example, the input ports 62 receive the output signals of the air flow meter 14, the intake-air temperature sensor 16, the throttle sensor 22, the water temperature sensor 38 and the vehicle speed sensor 40. The input ports 62 also multiplex the information. The digital output signals from the $O_2$ sensor 32, the crank angle sensor 36 and the clutch switch 54 are fed into the input/output ports 64. The CPU, a microprocessor, then compares the received information against any stored information, and then, if appropriate, issues an output to the input/output ports 64 which then subsequently output the appropriate instructions to the fuel injection valve 28, the upshift indicator lamp 56 and the loudspeaker 58.

The ROM memory means 66 works in conjunction with the CPU data processing means in the following manner: The ROM 66 stores a data map of the upshift and downshift zones of the engine in its warming-up stages, FIG. 4, and the engine in its warmed-up condition, FIG. 5, and also stores the data relating RPM, vehicle speed and engine load to the optimum gear shift position. The data processing means compares the actual operating conditions to the data stored in the ROM 66, and if appropriate, outputs a signal resulting in the shift indicator lamp going on.

In the operation of the above means, the ECU 42 calculates the fuel injection time period (TP) utilizing the following:

$$TP = K \cdot Q / RPM \tag{1}$$

where
K = constant
Q = the amount of intaken air
RPM = engine speed

Further, the basic fuel injection time period TP is adjusted by following equation:

$$TP' = F \cdot TP \tag{2}$$

where
TP' = adjusted fuel injection time period
F = compensation coefficient

TP' is determined by above-described equation and the actual fuel injection time period T is determined in light of the ineffective fuel injection time period TPI, which results from the inherent time delay in the fuel injector 28 because of a drop in the vehicle's battery voltage upon engaging the system. T is calculated as follows:

$$T = TP + TPI \qquad (3)$$

Upon calculation of T, a signal output corresponding to T is transmitted to the fuel injector 28. The injector 28 then opens for the time period T, and fuel is injected into the intake manifold 26 of the engine 10 for the duration of the time T.

Figure 5:
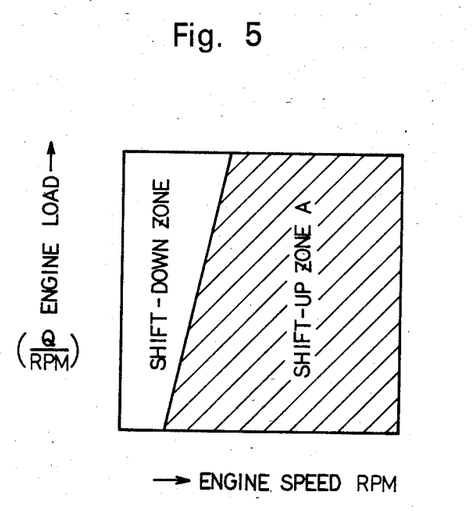
FIG. 5 is a graph illustrating a data map of upshift and downshift zones of a warmed-up engine.
Figure 6:
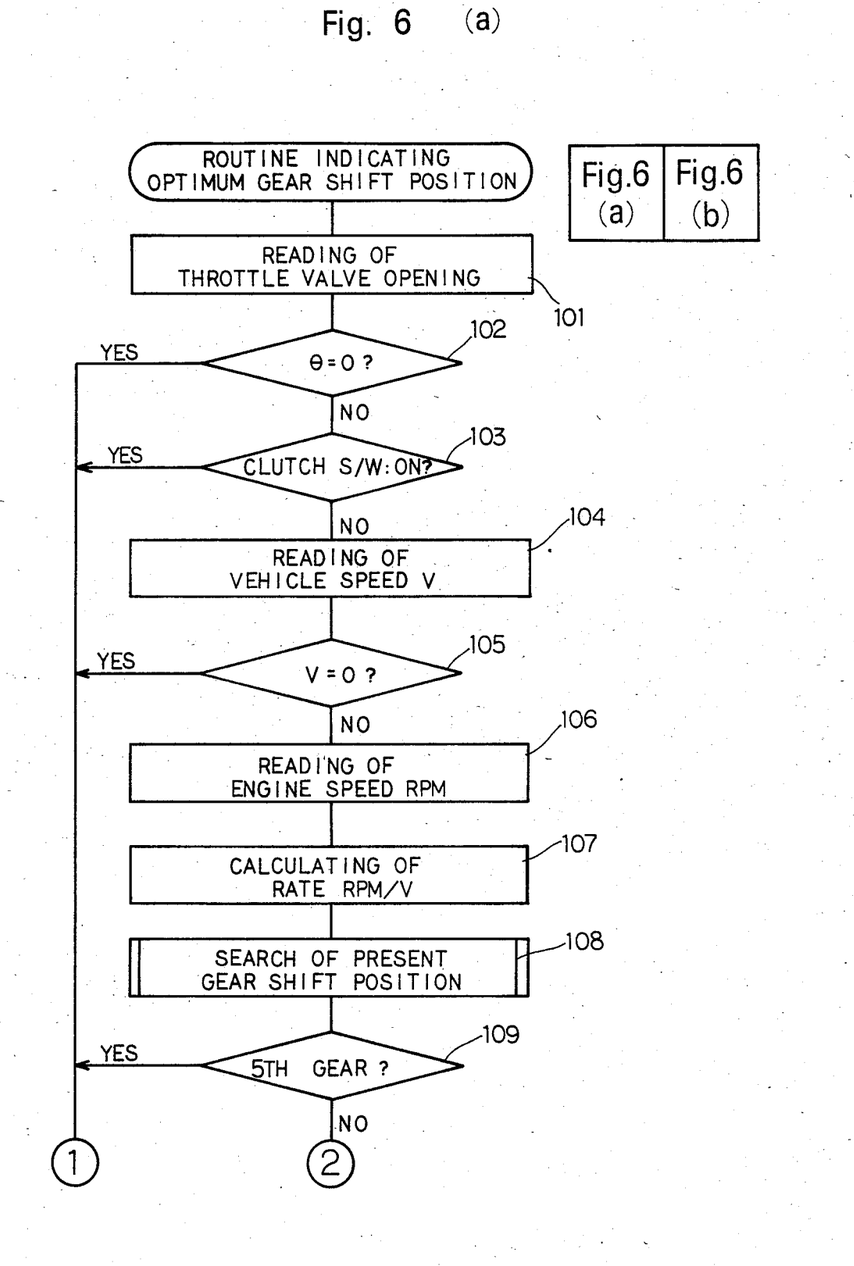
FIGS. 6a and 6b are flow charts illustrating operations according to the present invention.

The determination of whether the vehicle is in the appropriate gear is diagrammed by means of the flow chart in FIG. 6. The ECU 42 commences the operation upon turning on the vehicle's main power switch, whereupon the routine disclosed in FIG. 6 only takes place after a prescribed timing signal is issued (for example, the timing signal is issued every 60 seconds). The first step of the process is the reading of the throttle valve opening of the throttle valve 20 indicated by 101. The received data is stored by CPU 60 in RAM 68. Step 102 determines whether the throttle opening $\theta$ equals zero (i.e., if throttle valve is fully closed). If the throttle valve is open (i.e., $\theta \neq 0$), then step 103 determines whether the clutch switch 54 is ON. If the switch is OFF, then the program proceeds to step 104 which determines the vehicle's speed (V). If the vehicle's speed is not equal to zero, then step 105 indicates to the program to proceed to step 106 which reads the engine RPM by interpreting the output of the crank angle sensor 36. The program proceeds to step 107 which calculates the ratio of the engine's RPM to the vehicle's velocity V, hereinafter referred to as RPM/V. Next, in step 108, a search for the present gear shift position is performed. Then in step 109, it is determined whether the highest gear shift position, for example 5th gear, is engaged. If the result of the search is NO, then the program proceeds to step 110 wherein the reading of the engine load is performed. The engine load is defined as the amount of air intaken Q per the RPM of the engine. Next, in step 111, a reading of the temperature of the engine cooling water by the water temperature sensor 38 is performed. The program proceeds to step 112, which analyzed the step 111 reading. If the temperature of the engine cooling water is below a predetermined value, it is determined that the engine is warming-up. Once step 112 analyzes whether the engine is warmed-up or still warming-up, the routine is directed to step 113, if the engine is still warming-up, or step 114 if the engine is already warm. Each of these steps utilizes the data maps shown in FIGS. 4 and 5 that have been stored in RAM 68. The routine in step 113 is equivalent to the routine in step 114. The actual engine operating conditions are compared to the stored data maps. For example, in the warming-up data map of FIG. 4, the engine RPM is represented by $RPM_1$ and two different engine loads (Q/RPM) are represented by the points $L_1$ and $L_2$.

The routine then proceeds to step 115 where the program determines what specific shifting zone the engine is in. For example, if the operating conditions of the engine are accurately represented by $RPM_1$ and $L_1$ in FIG. 4, then the engine would be in the upshift area of the warming-up data map. The program would then continue to step 116 which would result in the upshift indicator lamp 56 going on. Upon proper response by the vehicle operator to the shift indicator lamp 56, the routine proceeds to step 117 which results in the operator hearing an audible sound confirming the proper response to the shift indicator lamp 56, thus completing the entire routine.

The above-discussed routine will not be followed if any of the steps 102, 103, 105 or 109 is YES or when the result of step 115 is NO. These results are respectively equivalent to: the throttle valve is not open, the clutch pedal is depressed, the vehicle velocity equals 0, the vehicle is in the highest gear and the engine is not in a zone which indicates that shifting is necessary. If any of the aforementioned results occurs, the routine proceeds to step 118 and ends without issuing any signal to the shift indicator lamp 56 or the loudspeaker 58.

Figure 4:
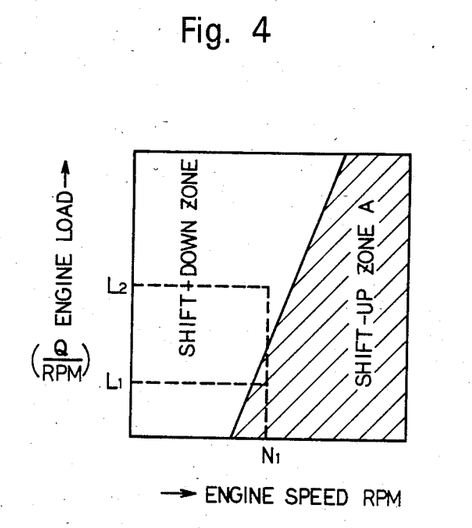
FIG. 4 is a graph illustrating a data map of upshift and downshift zones of an engine still in the warming-up stages.

According to the present embodiment, it is possible to construct a data map whereby both upshift and downshift instructions are given to the vehicle operator. This is accomplished by incorporating an upshift and downshift indicator lamp to work in conjunction with the data maps shown in FIGS. 4 and 5. The data maps of FIGS. 4 and 5 are not limited by a linear boundary line between the upshift and downshift zones. It is possible that the precise boundary between the upshift and downshift zones can be more precisely defined by an alternate line.

While the present invention has been described in its preferred embodiments, it is to be understood that the invention is not limited thereto but may be otherwise embodied within the scope of the following claims.

What is claimed is:

1. An apparatus for indicating an optimum time to shift a manual transmission installed in a vehicle comprising:

a first detecting means for detecting an actual engine speed;

a second detecting means for detecting an actual engine load;

a third detecting means for detecting an actual engine temperature;

memory means for storing a plurality of optimum relationships between engine speed, engine load and engine temperature each of said plurality of optimum relationships including a shift-up zone;

comparison means for comparing an actual relationship between said actual engine speed, said actual engine load, and said actual engine temperature plurality of optimum relationships between engine speed, engine load and engine temperature and outputting a shift-up signal when the actual relationship is in the shift-up zone of one of said plurality of optimum relationships; and instruction means for indicating a shift-up condition when the comparison means outputs a shift-up signal; whereby an operator is notified by said instruction means, when said actual relationship is in said shift-up zone of one of said plurality of relationships.

2. The apparatus of claim 1, wherein said shift zone stored in the memory means is non-linear.

3. The apparatus of claim 1, further comprising a fourth detecting means for detecting an actual gear shift position, said fourth detecting means outputting a cancel signal when said actual gear shift position is in a highest gear shift position, whereby said shift-up signal is not outputted from said comparison means, even when said actual realtionship is in said shift-up zone of said memory means.

4. The apparatus of claim 1, further comprising a fifth detecting means for detecting an opening of a throttle valve of the engine, said fifth detecting means outputting a cancel signal when said throttle valve is closed, whereby said shift-up signal is not outputted from said comparison means when said throttle valve is closed.

5. The apparatus of claim 1, further comprising a sixth detecting means for detecting when a clutch pedal is depressed, said sixth detecting means outputting a cancel signal when said clutch pedal is depressed, whereby said shift-up signal is not outputted from said comparison means when said slutch pedal is depressed.

6. The apparatus of claim 1, further comprising a seventh detecting means for detecting a vehicle speed, said seventh detecting means outputting a cancel signal when said vehicle speed is zero, whereby said shift-up signal is not outputted from said comparison means when said vehicle speed is zero.

7. The apparatus of claim 1, wherein each of said plurality of optimum relationships of said memory means further includes a shift-down zone.

8. The apparatus of claim 7, wherein said memory means includes a plurality of maps, each of said plurality of optimum relationships being stored in a separate map.

9. The apparatus of claim 7, wherein said shift zone stored in the memory means is linear.

10. The apparatus of claim 7, wherein said comparison means outputs a shift-down signal when said actual relationship is in said shift-down zone of said memory means, and said instruction means indicates a shift-down condition when said comparison means outputs said shift-down signal.

11. The apparatus of claim 7, wherein a first one of said plurality of optimum realtionships corresponds to a warmed-up condition of said engine, and a second one of said plurality of optimum relationships corresponds to a warming-up condition of said engine, and wherein said first one of said plurality of optimum relationships includes a first shift-down zone and a first said shift-up zone, and wherein said second one of said plurality of relationships includes a second shift-down zone, and a second shift-up zone.

12. The apparatus of claim 11, wherein said comparison means outputs a shift-down signal when said actual relationship is in said shift-down zone of one of said plurality of optimum relationships and said instruction means indicates a shift-down condition when said comparison means outputs said shift-down signal.

13. The apparatus of claim 12, further comprising a fourth detecting means for detecting an actual gear position, said fourth detecting means outputting a cancel signal when said actual gear shift position is in a highest gear shift position, whereby said shift-up signal is not outputted from said comparison means even when the actual relationship is positioned in the shift-up zone of said memory means.

14. The apparatus of claim 13, further comprising a fifth detecting means for detecting an opening of a throttle valve of the engine, said fifth detecting means outputting a cancel signal when said throttle valve is closed, whereby said shift-up signal is not outputted from said comparison means when said throttle valve is closed.

15. The apparatus of claim 14, further comprising a sixth detecting means for detecting when a clutch pedal is depressed, said sixth detecting means outputting a cancel signal when said clutch pedal is depressed, whereby said shift-up signal is not outputted from said comparison means when the clutch pedal is depressed.

16. The apparatus of claim 15, further comprising a seventh detecting means for detecting a vehicle speed, said seventh detecting means outputting a cancel signal when said vehicle speed is substantially zero, whereby said shift-up signal is not outputted from said comparison means when said vehicle speed is zero.

17. An apparatus for indicating an optimum time to shift a manual transmission installed in a vehicle comprising:
a first detecting means for detecting an actual engine speed;
a second detecting means for detecting an actual engine load;
a third detecting means for detecting an actual engine temperature;
a memory means for storing a plurality of optimum relationships between engine speed, engine load and engine temperature, said memory means including a plurality of maps each of said plurality of optimum relationships being stored in a separate map, a first one of said plurality of optimum relationships corresponding to a warmed-up condition of said engine and including a shift-down zone and a shift-up zone, and a second one of said optimum relationships corresponding to a warming-up condition of the engine and including a second shift-down zone and a second shift-up zone;
a comparison means for comparing an actual relationship between said actual engine speed, said actual engine load and said actual engine temperature with said stored plurality of optimum relationships between said engine speed, said engine load and said engine temperature and outputting a shift-up signal when said actual relationship is in said shift-up zone of said memory means; and
an instruction means for indicating a shift-up condition when said comparison means outputs said shift-up signal;
whereby an operator is notified by said instruction means, when said actual relationship is positioned in the shift-up zone of said memory means.

18. The apparatus of claim 17, further comprising a fourth detecting means for detecting an actual gear shift position, said fourth detecting means outputting a cancel signal when said actual gear shift position is in a highest gear shift position, whereby said shift-up signal is not outputted from said comparison means even when said actual relationship is positioned in said shift-up zone of one of said optimum relationships.

19. The apparatus of claim 17, further comprising a fifth detecting means for detecting an opening of a throttle valve of the engine, said fifth detecting means outputting a cancel signal when said throttle valve is closed, whereby said shift-up signal is not outputted from said comparison means when said throttle valve is closed.

20. The apparatus of claim 17, further comprising a sixth detecting means for detecting when a clutch pedal is depressed, said sixth detecting means outputting a cancel signal when said clutch pedal is depressed, whereby said shift-up signal is not outputted from said comparison means when the clutch pedal is depressed.

21. The apparatus of claim 17, further comprising a seventh detecting means for detecting a vehicle speed, said seventh detecting means outputting a cancel signal when said vehicle speed is substantially zero, whereby said shift-up signal is not outputted from said comparison means when said vehicle speed is zero.

* * * * *